SINGLE SIDEBAND TRANSCEIVER HAVING COMMON TRANSMIT AND RECEIVE APPARATUS

Filed Nov. 20, 1963

Inventor
Gilbert J. Kowols
By George E. Frost - Keith J. Kulie
Attorneys 3,300,720

SINGLE SIDEBAND TRANSCEIVER HAVING COMMON TRANSMIT AND RECEIVE APPARATUS

Gilbert J. Kowols, Chicago, Ill., assignor, by mesne assignments, to Mark Products Company, Skokie, Ill., a corporation of Illinois Filed Nov. 20, 1963, Ser. No. 325,051
5 Claims. (Cl. 325—20)

Figures 1, 2:
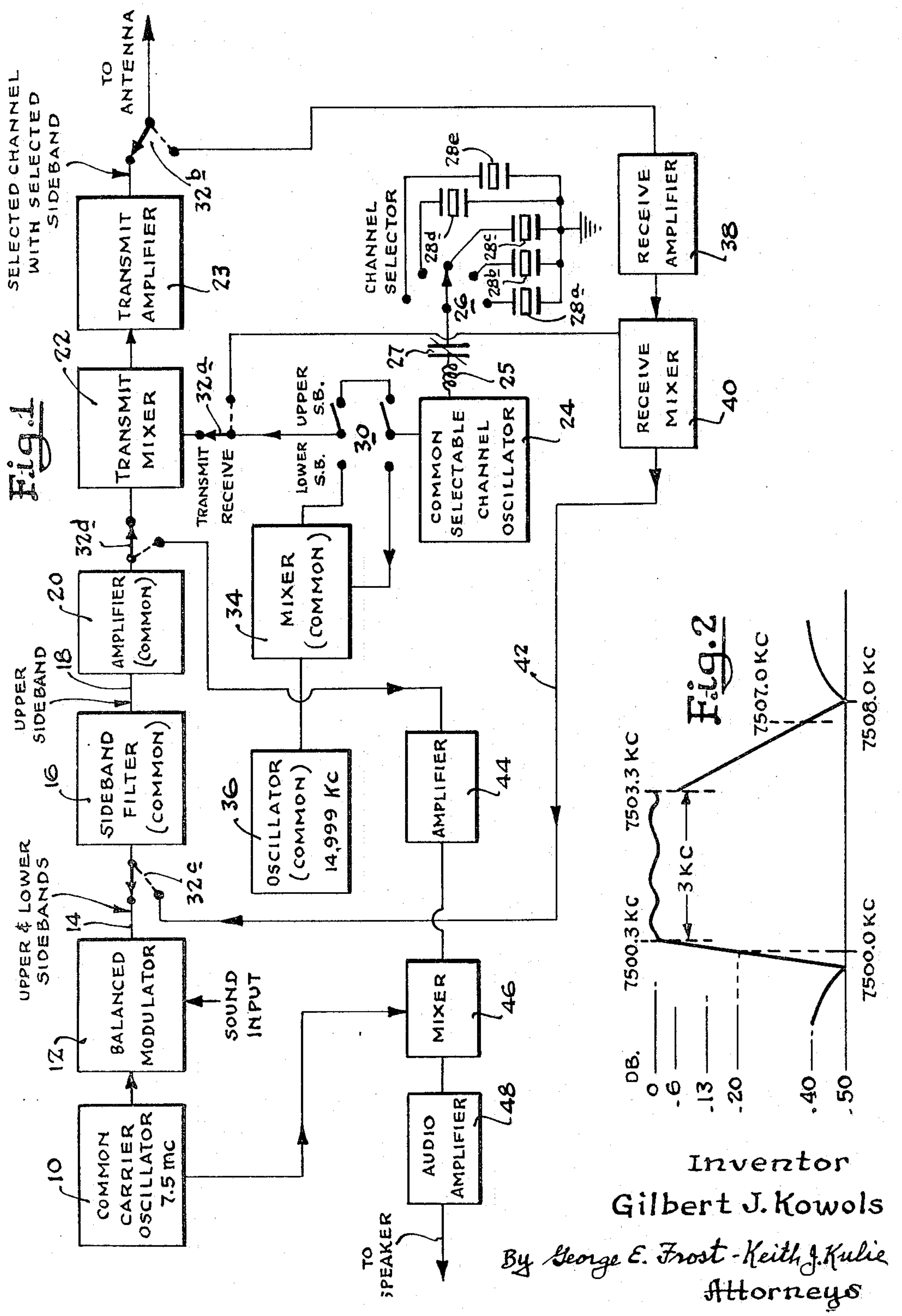

My invention relates to a single sideband radio apparatus particularly suitable for use in transmitting or receiving signals in the citizens' band and utilizing, as desired, the uppor or lower half of a selected channel with a predetermined frequency gap between the side band portions utilized similar to that provided between adjacent channels.

So-called Class D citizens' band radio service is based on the free use by any number of users of any desired one of 23 channels assigned for this purpose. At the present time each such frequency channel is 10 kilocycles in width, the lowest channel center frequency is 26.965 megacycles and the highest channel center frequency is 27.255 megacycles. Persons choosing to communicate in the citizens' band need only select whatever channel they please and—so long as they hold within set standards of output power and operating frequency—they may communicate at will from fixed or mobile stations.

At the present time the usage of citizens' band radio service is so great that channel saturation is being encountered in some instances. Such saturation results when the number of transmitters operating on a specified channel in a particular area and at the same time is so great that receivers pick up unwanted interfering signals that prevent reception of the desired signal. There is accordingly a need for apparatus capable of communicating on the citizens' band channels in a manner occupying less than a complete channel and thereby accommodating more communications within the assigned total channel width. Because of this need, a substantial demand has existed for a single sideband communicating eqiupment operable in any selected channel of the citizens' band and with a choice of upper or lower sideband. The value of such apparatus is evident when it is recalled that if all communication could be made on a single sideband basis, the 23 channels now assigned would in effect become 46 channels and would accommodate substantially twice the number of separate communications in the same place at the same time.

Conventional single sideband equipment, such as that used by amateurs, is not suitable for citizens' band operation. In the first place, citizens' band operation requires transmission and reception within a single selected 10 kc. channel at about 27 megacycles. Such operation requires the generation of frequencies with a high degree of exactness and stability or, with variable frequency equipment, the generation of frequencies in a highly stable manner and with an exact adjustment as to frequencies. Moreover, it is desirable to provide a frequency gap or separation between upper and lower sidebands used on a single channel—as well as between sidebands used on adjacent channels—so that adjacent sideband and adjacent channel interference is minimized. In addition, since citizens' band equipment is intended for use by persons with virtually no technical understanding of radio or ability to operate complex equipment, the equipment must be nearly as easy to operate as a home television receiver. In fact, the equipment should include no more than an off-switch, transmit-receive switch, channel selector, sideband selector, and perhaps a fine frequency control in the nature of a tone control.

Many of these requirements can be accommodated in a single sideband apparatus based on the use of crystal oscillators. Through the use of 46 possible crystals it is possible to provide a selection of the particular channel and particular sideband of operation. But this physical possibility becomes an economic impossibility when consideration is given to the problem of stocking and supplying such a vast number of crystals. It is accordingly highly desirable to provide a single sideband apparatus for use in the citizens' band that has the advantages of crystal control as to channel selection, while at the same time is selectively operable in the upper or lower sideband of any selected channel without recourse to an additional crystal.

It is therefore a general object of the present invention to provide a single sideband radio apparatus which is selectively operable in the lower or the upper sideband of any one of a plurality of channels while at the same time requires only one crystal per channel and provides a predetermined frequency gap between adjacent upper and lower sidebands for each carrier frequency.

A further object of the present invention is to provide apparatus of the foregoing type which is suitable for use selectively as a transmitter or receiver and incorporates elements common to both operations for selecting the lower or the upper sideband of any channel.

It is an additional object of the present invention to provide apparatus of the foregoing type which is simple and inexpensive in construction, highly reliable, readily operated, and in other respects is especially suitable for citizens' band communication.

The novel features which I believe to be characteristic of my invention are set forth with particularity in the appended claims. My invention itself, however, together with further objects and advantages thereof, will best be understood by reference to the following description taken in connection with the accompanying drawings, in which:

FIGURE 1 is a block diagram of a transmitter-receiver apparatus constructed in accordance with a preferred form of the present invention; and, FIGURE 2 is a curve indicating the frequency response curve of the sideband filter of the apparatus of FIGURE 1.

*The transmitter*

The construction and operation of the apparatus of FIGURE 1 can best be understood by considering first the operation as a transmitter. The common carrier oscillator 10 produces 7.5 megacycle carrier oscillations. This oscillator may be of any suitable type. Preferably, it is crystal controlled to assure stability and accuracy of operating frequency, with the crystal temperature controlled for further assurance that the frequency is very close to the 7.5 megacycle value. In an apparatus constructed in accordance with the arrangement of FIGURE 1, for example, a type 6EA8 tube was used in a Butler crystal oscillator circuit with the pentode section further serving as an electron coupled buffer.

Oscillations from the oscillator 10 are applied to the balanced modulator 12, together with the signal input (usually sound) and signals from microphone and audio amplifier (not shown) desired to be communicated. This modulator may either be of the multitude balanced type using bridge circuitry to balance out the carrier (see Terman, Radio Engineers Handbook, 1943, page 551), or in the alternative, may use a type 6JH8 tube in a sheet beam balanced moduator to generate upper and lower sidebands free from carrier oscillations. In either event, the balanced modulator output path 14 includes upper and lower sidebands substantially free from carrier oscillations. If the signal input is 100 to 4000 cycle sound frequencies, for eaxmple, the output path 14 includes a lower sideband extending from 7,496,000 cycles up to 7,499,900 cycles and an upper sideband extending from 7,500,100 cycles to 7,504,000 cycles.

The upper and lower sidebands are applied to the sideband filter 16 through the transmit-receive switch arm 32*c*. Preferably, an impedance matching cathode follower is inserted in this signal path as a part of the filter unit 16 to match the high output impedance of the modulator 12 to the relatively low input impedance of filter 16. This filter is preferably of the type using a plurality of crystals in a network effective to define a pass band covering one of the sidebands while excluding the other sideband. Such a pass band is shown for illustrative purposes in FIGURE 2, this being the characteristic of a filter used in an apparatus constructed in accordance with FIGURE 1, for citizens' band communication. As shown, the filter serves to pass more of the upper sideband, namely the three kilocycle band running from 7,500,300 cycles to 7,503,300 cycles. The carrier frequency of 7,500,000 cycles is passed only with a 20 decibel loss and lower sideband components (7,496,000 cycles to 7,499,900 cycles) are passed only with 40 or more decibel loss. As shown, frequency components above the upper sideband, such as 7,507,000 cycles, are similarly suppressed.

The net effect of the foregoing is to provide in the output circuit of the filter 16 an upper sideband signal substantially free from lower sideband components, this signal for example occupying from about 7,500,300 cycles to 7,503,300 cycles. These signals are applied through line 18 to amplifier 20. This amplifier, in an apparatus for use in citizens' band communication, used a type 12BA6 tube operating in class A fashion as a voltage amplifier. As hereinafter described, the signals from amplifier 20 are applied to the transmit mixer 22 to produce signals occupying a selected upper or lower half of a channel in the citizens' band.

The common selectable channel oscillator 24 is selectively operable at any one of a plurality of frequencies. Each such frequency, when mixed with the single side band 7.5 megacycle oscillations, produces a sum frequency component occupying one side band of a channel in the citizens' band, that is about 27 megacycles. The oscillator 24 is of the crystal controlled type, and may include provisions for selecting any one of a plurality of crystals. This is shown diagrammatically in FIGURE 1 where switch 26 selectively connects to crystal 28*a*, 28*b*, 28*c*, 28*d*, or 28*e*, as desired, and thereby provides for the selection of any one of five operating frequencies. The oscillator 24 may be any suitable crystal oscillator circuit. In an apparatus constructed in accordance with FIGURE 1 for citizens' band use, the oscillator used a 6EA8 tube in a Butler circuit with the pentode section operating as an electron coupled amplifier. The crystals were located in a temperature controlled container with the crystal of oscillator 10 to provide a high degree of frequency stability for both oscillator 10 and oscillator 24.

For one sideband operation, oscillator 24 is directly connected through the double pole double throw sideband selector switch 30 and the transmit receive switch arm 32*a* to the transmit mixer 22. In a unit constructed in accord with FIGURE 1 for citizens' band operation, mixer 22 was a pentagrid mixer using a 12BE6 tube. In a unit constructed for citizens' band communication, this connection was used to produce an upper sideband transmission from the upper sideband 7.5 megacycle output of amplifier 20. The oscillator 24 was accordingly operated at a selected frequency lower than the channel center frequency by 7.5 megacycles. Thus, for channel 1 in the citizens' band, which has a center frequency of 26,965 kilocycles, the selected crystal of oscillator 24 was 19,465 kilocycle crystal. Similarly, for channels 2, 3, 4 and 5, the crystals selected for oscillator 24 are 19,475 kc., 19,485 kc., 19,505 kc. and 19,515 kc. so as to produce at mixer 22 upper sidebands in relation to the center channel frequencies of 26,975 kc., 26,985 kc., 26,995 kc. and 27,005 kc.

The upper sideband oscillations thus produced at transmit mixer 22 are applied to transmit amplifier 23, which increases the power thereof to the desired value, such as five watts peak envelope power. This amplifier is of conventional construction with a sufficiently narrow frequency band to reject the undersired difference frequency components of about 12 megacycles that result from the difference of about 19.5 megacycles produced by oscillator 24 and 7.5 megacycles from amplifier 20. In an apparatus constructed in accordance with FIGURE 1, the amplifier 23 used two type 6BQ5/EL84 tubes in a two stage circuit. The first stage was operated class AB1 and the second stage class AB2 to produce about 5 watts peak envelope power output.

The radio frequency power fro mthe transmit amplifier 23 is applied through the transmit-receive selector switch arm 32*b* to the antenna for radiation.

Lower sideband selection is made by shifting the sideband selector switch 30 to energize mixer 22 from the mixer 34. The latter mixer receives approximately 19 megacycle oscillations from the common selectable cannel oscillator 24, the particular frequency varying in accord with the channel selected as above described. This energizing circuit may be traced from the oscillator 24 through the lower pole of switch 30 as seen in FIGURE 1 to the mixer 34 (the switch 30 being in the alternate position in relation to that shown in FIGURE 1).

Mixer 34 also receives 14,999 kilocycle oscillations. These are generated in the apparatus of FIGURE 1 by oscillator 36. Preferably, this oscillator is crystal controlled to provide a high degree of frequency stability for effective upper and lower sideband spacing as hereinafter described.

The approximately 15 megacycle oscillations from oscillator 36 and the approximately 19 megacycle oscillations from oscillator 24 give rise to sum and difference frequency components in the output of mixer 34. In a citizens' band unit constructed in accord with FIGURE 1 a 6EA8 tube was used for this purpose, the signals from oscillator 24 being fed to the control grid and the signal from oscillator 36 being fed to the cathode. The difference frequency component is about 4 megacycles. The sum frequency component is about 34 megacycles and serves to produce lower sideband transmissions as hereinafter described. Both components are applied from mixer 34 to the transmit mixer 22 through the sideband selector switch 30 and the transmit receive switch 32*a*, as shown.

The approximately 4 megacycle output frequency from the mixer 34 is suppressed in substantial measure by tuned circuits in the mixer itself, which resonate at about 34 megacycles. To the extent such frequencies appear in the output circuit, they are further suppressed by tuned circuits in the mixer 22. The sum and difference frequencies produces in mixer 22 as a consequence of the 4 megacycle output component of mixer 34 are about 11.5 megacycles and 3.5 megacycles, respectively. The circuits of amplifier 23, which are tuned to about 27 megacycles, eliminate any significant residuum of these frequencies.

The approximately 34 megacycle frequency components from mixer 34 create, at transmit mixer 22, sum frequency components of about 42 megacycles (7.5 mc. plus 34 mc.). These, too, are eliminated from the output wave by circuits in mixer 22 and amplifier 23 which are tuned for operation in the citizens' band frequency range of about 26.9 to about 27.2 megacycles. The difference frequency components at mixer 22 created by the approximately 34 megacycle frequency components from the mixer 34 are at about 26.5 megacycles. The exact frequency value is determined by the specific channel selection of the oscillator 24. It should be noted, however, that these approximately 26.5 megacycle frequency components occupy the lower sideband of the channel selected, so that the net effect of positioning switch 30 in the lower sideband position is to produce, at mixer 22, a signal modulated in accordance with the input to modulator 12 but occupying the lower sideband of the selected channel and constituting (except as to the frequency gap hereafter discussed) the same signal that would have been produced at amplifier 23, using a filter 16 that selected the lower sideband.

The reason the signal produced with the switch 30 in the lower sideband position occupies the lower sideband may be explained as follows. The relevant oscillations from mixer 34 applied to the mixer 22 are at the same frequency as those produced by the oscillator 24, but increased by about 15 megacycles. Thus, with the oscillator 24 in the channel 1 position, it produced 19,465 kilocycle oscillations and the relevant output oscillations of mixer 34 are 34,465 kilocycles. The amplifier 20 produces the upper sideband components of the 7.5 megacycle carrier of oscillator 10. With a filter having the characteristics shown in FIGURE 2, for example, these oscillations range from 7,500,300 cycles to 7,503,300 cycles. Since the difference frequency output from the mixer 22 is of interest, the resulting frequency band ranges—for channel 1—from 34,465 kilocycles minus 7,500.3 kilocycles down to 34,465 kilocycles minus 7,503.3 kilocycles. The resulting frequency range is from 26,964.7 kilocycles down to 26,961.7 kilocycles. These are within the low frequency half of channel 1, which extends from 26,960 kilocycles up to the channel center frequency of 26,965 kilocycles.

When some other channel is selected by oscillator 24, a like action occurs to produce—with the switch 30 in the lower sideband position—an output signal from the mixer 22 confined to the lower half of the channel selected. To illustrate more specifically, the frequencies in the apparatus of FIGURE 1 for the first five citizens' band channels and for both upper side band and lower sideband transmission are as follows:

| Channel | Center Frequency (kc.) | Oscillator 24 (kc.) | Output of Mixer 22, Switch 30 in Upper Sideband Position (kc.) | Output of Mixer 22, Switch 30 in Lower Sideband Position (kc.) |
|---|---|---|---|---|
| 1 | 26,965 | 19,465 | 26,965.3—26,968.3 | 26,960.7—26,963.7 |
| 2 | 26,975 | 19,475 | 26,975.3—26,978.3 | 26,970.7—26,973.7 |
| 3 | 26,985 | 19,485 | 26,985.3—26,988.3 | 26,980.7—26,983.7 |
| 4 | 27,005 | 19,505 | 27,005.3—27,008.3 | 27,000.7—27,003.7 |
| 5 | 27,015 | 19,515 | 27,015.3—27,018.3 | 27,010.7—27,013.7 |

In every instance, it will be noted, the crystal selection provided by switch 26 serves to select the channel in which the transmission takes place. Also, in every instance, the selection as to sideband occupied is achieved by the switch 30. Since both operations entail only a mere selector switch actuation, it is possible for an untrained operator to use the apparatus effectively.

*The receiver*

For receiver operation, the transmit-receive switch 32a is positioned in the receive position indicated by the dashed lines, FIGURE 1. The signals received by the antenna are therefore applied to the receive amplifier 38, which is a conventional radio frequency amplifier operating in the frequency range of the possible selection of transmitted signals. For citizens' band operation, for example, this range is from about 26.9 megacycles up to about 27.2 megacycles. The resultant amplified received signals are applied to mixer 40, together with the output of oscillator 24 or, selectively, the output of mixer 34. In a citizens' band apparatus constructed in accord with FIGURE 1, the mixer 40 was a pentagrid mixer using a 6BE6 tube. The resultant sum and difference frequencies are applied through the circuit 42 to the sideband filter 16 when switch arm 32c is in receive position indicated by the dashed lines. This filter passes only those components in the 7,500.3 kilocycle to 7,503.3 kilocycle range. The frequency components thus passed are applied via switch 32d in the receive position, indicated by the dashed lines, to the amplifiers 20 and 44 and thence to the mixer 46. In a citizens' band unit constructed in accord with FIGURE 1, amplifier 44 was made like amplifier 20. The mixer 46 receives 7.5 megacycle oscillations from the common carrier oscillator 10 to produce a beat frequency component in the range of 300 cycles to 3300 cycles. These are a reproduction of the original modulating signal, which is passed to amplifier 48 and then to a speaker or other reproducing device (not shown).

Mixer 46 in a citizens' band unit constructed in accordance with FIGURE 1, was a 12BE6 in a product detector circuit.

The receiver exhibits a high degree of selectivity for the same channel and sideband as is selected for transmission by the selector switch 26 and the sideband selector switch 30. If, for example, the selector switch 26 is set for the channel 1 crystal and the selector switch 30 for the upper sideband operation, the oscillations applied to mixer 40 through the switch 30 are at 19,465 kilocycles. If the received signals from amplifier 38 are in the range of 26,965.3 to 26,968.3 kilocycles the difference frequency components will range from 7,500.3 kilocycles to 7,503.3 kilocycles. These are in the pass band of the filter 16, to which the output of mixer 40 is applied through the circuit 42. Any frequency components in the citizens' band range that appear in the signal from amplifier 38 but are outside of the 26,965.3 to 26,968.3 kilocycle range are suppressed by the filter 16 in accordance with the characteristic shown in FIGURE 2, with the result that a high degree of selectivity for the upper half of channel 1 is obtained. Channel 1 upper sideband signals are accordingly received to the exclusion of other signals.

If, however, the switch 30 is shifted to the lower sideband positions, the oscillations applied to mixer 34 are 19,465 kc. (oscillator 24) and 14,999 kc. (oscillator 36), to produce 34,464 kilocycles output from mixer 34 for application to mixer 40. Received signals in the 26,960.7 to 26,963.7 kilocycle range produce difference frequency components in the range of 7,503.3 to 7,500.3 kilocycles, which are within the pass band of filter 16, as shown in FIGURE 2. Accordingly, these signals will be received to the exclusion of other signals and the information they contain reproduced by the speaker or other reproducing device. Since the range of 26,960.7 to 26,963.7 kilocycles is in the lower half of the channel 1 (26,460 to 26,470 kilocycles), the receiver operates to receive lower sideband signals of channel 1 with the switch 30 in the lower sideband position.

*Overall operation*

It will be noted that the common carrier oscillator 10, the sideband filter 16, the oscillator 36, mixer 34, and oscillator 24 are common to both the transmitting and receiving arrangement of FIGURE 1. These elements are accordingly energized and in operating condition whether transmission or reception is taking place. For transmission, it is also necessary to use modulator 12, amplifier 20, mixer 22 and amplifier 23. These elements may be energized continuously or, if desired, one or more of them may be connected to an off-on switch gauged to the transmit-receive switch 32 so that they are turned on for transmission and off for reception. Similarly, amplifier 38, mixer 40, amplifier 44, mixer 46 and amplifier 48 are required only for reception. They may be either energized continuously or, if desired, one or more of them may be connected to an on-off switch ganged to the transmit-receive switch 32 so that they are turned on for reception and off for transmission.

The respective portions 32*a*, 32*b*, 32*c*, 32*d* of the transmit-receive switch as shown in FIGURE 1 serve to isolate the unused transmitting or receiving circuitry. They are preferably electrically separate double throw units of a common switch for activation in unison at the will of the operator. It will be apparent that to the extent such isolation is not required, portions of this switch may be omitted and the circuits directly connected.

*Sideband spacing for each carrier frequency*

It will be noted from the above tabulation that the highest frequency of each lower sideband is spaced from the lowest frequency of the upper sideband of the same channel by 1600 cycles. This is 1000 cycles more than the gap of 600 cycles associated with the 300 cycle minimum audio frequency. Also it will be noted that a spacing of at least 2400 cycles separates the highest frequency in the upper sideband of each channel and the lowest frequency in the lower sideband of the next higher channel. With these frequency spacings, the co-channel interference, or crosstalk, between the two sidebands of each channel is reduced, with the result that each sideband has an increased freedom from interference from stations operating on the other sideband of the same channel than would otherwise exist. If desired, the selected frequencies of oscillator 24 may be offset by a proper choice of the frequency of oscillator 36 to provide other spacings between upper and lower sidebands of a specified channel. For example, by using a frequency of 14,998.6 kilocycles in oscillator 36, the upper and lower sidebands are spaced by 2 kilocycles and the closest frequencies of the most closely spaced adjacent channels are likewise spaced, by 2 kilocycles. In such instance the frequency gaps are equalized to provide the same gap between upper and lower sidebands of a single channel and the most nearly spaced frequencies of different channels.

In the apparatus above described, the fidelity of reproduction depends upon the exactness by which the locally generated oscillations at the receiver match the locally generated oscillations at the transmitter. Variations in operating conditions, necessary design variations in the crystals and other components, and similar considerations preclude providing transmitter and receivers that match perfectly. To accommodate this practical fact, it is desirable to provide a fine frequency control for the oscillator 24, at least when it is used for reception. This can be accomplished through the use of a variable loading capacitor in this oscillator which, within narrow limits and without altering the essential action of the crystals in fixing the operating frequency, serves to provide a fine frequency adjustment. Such adjustment gives rise to changes in the sound produced by the speaker similar in character to those associated with the tone control of a conventional radio. In the actual device for citizens' band operation referred to above, the capacitor 27, FIGURE 1, was used for this purpose. This capacitor was variable between about 10 picofarads and about 60 picofarads. Coil 25 of about 1.3 microhenries in series with the capacitor 27 and crystal served to enhance the frequency control provided.

The apparatus of FIGURE 1 and using a filter having the characteristics of FIGURE 2 has a high degree of selectivity between each of the 46 operating frequencies made possible in the citizens' band and each of the others, including the adjacent operating frequencies. This results in part from the fact that filter 16 suppresses any residual carrier as well as the very low frequency signal components. Tests with one unit fixed and the other in an automobile and not using any frequency spacing other than that provided by the lowest audio frequency (about 600 cycles), for example, have shown that it is necessary to bring the automobile quite close to the fixed station before a unit receiving an upper side band responds significantly to lower side band transmissions from the same channel. And at the distance of about one half mile the signals on the adjacent sideband are so far attenuated as to be hardly noticeable. Tests were made using less than 5 watts transmitter power output. With the additional spacing between upper and lower sidebands provided by the apparatus of FIGURE 1, even less interference will occur.

In the apparatus of FIGURE 1, frequency gap achieved between the upper and lower sidebands of any particular channel is equal to twice the lowest audio frequency plus the extent the frequence of oscillator 36 is less than twice the frequency of the common carrier oscillator 10. More generally, the difference between the oscillator 36 and twice the frequency of the oscillator 10 is in the opposite sense to the relationship between the sideband selected by filter 16 and the frequency of carrier 10. Thus, with the sideband filter 16 constructed to pass the upper sideband and select the lower sideband, the oscillator 36 has a lower frequency than twice the frequency of oscillator 10 and vice versa. The frequency gap produced by oscillator 36 is then in additive relation to the frequency gap produced as a consequence of the lowest audio frequency.

If desired, automatic volume control, squelch, noise limiting and other circuitry may be employed in the apparatus for better operation. Such arrangements form no part of the present invention.

While I have shown and described particular embodiments of the present invention, it will, of course, be understood that various modifications and alternative arrangements may be made without departing from the true spirit and scope thereof. I therefore intend by the appended claims to cover all such modifications and alternative constructions that fall within their true spirit and scope.

What I claim as new and desire to secure by Letters Patent of the United States is:

1. A single sideband radio apparatus including a transmitter and receiver with circuit elements functionally common to each, and wherein said apparatus is operable in either the upper or the lower sideband of a frequency channel selected from a plurality of available channels, comprising in combination:

a common carrier oscillator operable at predetermined carrier frequency;

a source of modulating signal to be transmitted;

transmitter modulator means electrically interconnected with said carrier oscillator and said source and effective to produce sideband signal components thereof;

first common circuit means effective to produce one of said sidebands substantially free of the other sideband;

a common selectable channel oscillator having a frequency equal to the difference in frequency between the common carrier oscillator and the frequencies of said available channels, respectively, said oscillator being selectively operable at any one of a plurality of said frequencies;

second common circuit means operable to produce signal having substantially twice the frequency of said common carrier oscillator and differing therefrom by a predetermined amount in the opposite sense to the difference between said one sideband and the carrier;

common signal mixing means to mix signals from said last means and said selectable channel oscillator, thereby producing oscillations of frequency substantially equal to the sum of the selectable channel oscillator frequency and twice the carrier frequency;

first transmitter means operable to mix signal from said first circuit means and, selectively, oscillations from said selectable channel oscillator or said second circuit means, thereby selectively providing signals in either the upper or the lower sideband of the selected channel;

means for electrically interconnecting said first transmitter means, said first circuit means, said channel oscillator means, and said circuit means;

second transmitter means electrically interconnected to said first transmitter means and operative to amplify the received signals for radiation;

signal receiving means effective to receive signals in said channels;

receiving mixing means responsive to said receiving means and, selectively, the output of said common selectable channel oscillator or said common signal mixing means, whereby received signal in the upper or the lower sideband and said selected channel produces sideband components at said predetermined frequency of the common carrier oscillator;

means operable to apply signals from said receiving mixing means to said first common circuit means;

means to mix the output of said first common circuit means and the common carrier oscillator; and modulating signal reproducing means electrically interconnected with and responsive to said last means, whereby two-way communication may be made on the selected upper or lower sideband of the selected channel with a frequency gap between said sidebands.

2 A single sideband radio apparatus including a transmitter and receiver with circuit elements functionally common to each, and wherein said apparatus is operable in either the upper or the lower sideband of a frequency channel selected from a plurality of available channels of at least predetermined frequency spacing comprising in combination:

a common carrier oscillator operable at predetermined carrier frequency;

a source of modulating signal to be transmitted;

transmitter modulator means electrically interconnected with said carrier oscillator and said source and effective to produce sideband signal components thereof;

common means effective to produce one of said sidebands substantially free of the other sideband;

a common selectable channel oscillator having a frequency equal to the difference in frequency between the common carrier oscillator and the frequencies of said available channels, respectively, said oscillator being selectively operable at any one of a plurality of said frequencies;

oscillator means operable to produce signal having frequency deviating from twice the frequency of said common carrier oscillator in a substantial amount less than said frequency spacing and in the opposite sense to the difference between said one sideband and the carrier;

common signal mixing means to mix signals from said last means and said selectable channel oscillator, thereby producing oscillations of frequency substantially equal to the sum of the selectable channel oscillator frequency and twice the carrier frequency;

first transmitter means operable to mix signal from said common circuit means and, selectively, oscillations from said selectable channel oscillator or said oscillator means, thereby selectively providing signals in either the upper or the lower sideband of the selected channel;

means for electrically interconnecting said first transmitter means, said common circuit means, said selectable channel oscillator and said oscillator means;

second transmitter means electrically interconnected to said first transmitter means and operative to amplify the received signals for radiation;

signal receiving means effective to receive signals in said channels;

receiving mixing means responsive to said receiving means and, selectively, the output of said common selectable channel oscillator or said common signal mixing means, whereby received signal in the upper or the lower sideband of said selected channel produces sideband components at said predetermined frequency of the common carrier oscillator;

means operable to apply signals from said receiving mixing means to said common means;

means to mix the output of said common means and the common carrier oscillator; and, modulating signal reproducing means electrically interconnected with and responsive to said last means, whereby two-way communication may be made on the selected upper or lower sideband of the selected channel with a frequency gap between said sidebands similar to that between adjacent channels.

3. A single sideband radio transmitter selectively operable in either the upper or the lower sideband of a frequency channel selected from a plurality of available channels of predetermined frequency width, comprising in combination:

a carrier oscillator operable at predetermined frequency;

a source of modulating signal;

a first circuit means responsive to said oscillator and said source effective to produce one of the sidebands thereof substantially free of signal components in the other sideband thereof and the carrier;

a selectable channel oscillator having a frequency equal to the difference in frequency between the carrier oscillator and the frequencies of said available channels, respectively, said oscillator being selectively operable at any one of a plurality of said frequencies;

second circuit means operable to produce signal having frequency deviating from twice the frequency of said carrier oscillator and differing therefrom by a predetermined amount in opposite sense to the difference between said one sideband and the carrier;

first signal mixing means to mix signal from said second circuit means and said selectable channel oscillator, thereby producing oscillations of frequency equal to the sum of the selectable channel oscillator frequency and substantially twice the carrier frequency; and second signal mixing means operable to mix signal from said first circuit means and, selectively, oscillations from said selectable channel oscillator or said last means, thereby selectively providing signals in either the upper or the lower sideband of the selected channel with a frequency spacing therebetween.

4. A single sideband radio receiver selectively operable in either the upper or the lower sideband of a frequency channel selected from a plurality of available channels, comprising in combination:

signal receiving means effective to receive signals to said channels;

a carrier oscillator operable at predetermined frequency;

a selectable channel oscillator having a frequency equal to the difference in frequency between the carrier oscillator and the frequencies of said available channels, respectively, said oscillator being selectively operable in any one of a plurality of said frequencies;

circuit means operable to produce signal having frequency deviating from twice the frequency of said carrier oscillator and differing therefrom by a predetermined amount in the opposite sense to the difference between said one sideband and the carrier;

first mixing means to mix signal from said circuit means and said selectable channel oscillator, thereby producing oscillations of frequency substantially equal to the sum of the selectable channel oscillator frequency and twice the carrier frequency;

second mixing means responsive to said receiving means and, selectively, the output of said selectable channel oscillator or said first mixing means, whereby received signal in the upper or the lower sideband of said selected channel produces a sideband component at the frequency of said carrier oscillator, the sideband components in the presence of an upper sideband received signal being spaced by a frequency gap in relation to the sideband component in the presence of a lower sideband received signal;

means responsive to said second mixing means and effective to produce one sideband substantially free of the other sideband;

means to mix the output of said filter means and the carrier oscillator; and, modulating signal reproducing means responsive to said last means.

5. A single sideband radio apparatus including a transmitter and receiver with circuit elements common to each, and wherein said apparatus is operable in either the upper or the lower sideband of a frequency channel selected from a plurality of available channels, of at least predetermined frequency spacing, comprising in combination:

a common carrier oscillator operable at predetermined carrier frequency;

common filter means effective to pass one sideband with respect to said carrier frequency substantially free of the other sideband;

a common selectable channel oscillator having a frequency equal to the difference in frequency between the common carrier oscillator and the frequencies of said available channels, respectively, said oscillator being selectively operable at any one of a plurality of said frequencies;

common circuit means operable to produce signal having substantially twice the frequency of said common carrier oscillator and deviating therefrom in a substantial amount less than said frequency spacing and in opposite sense to the difference between said one sideband and the carrier;

common signal mixing means to mix signals from said circuit means and said selectable channel oscillator, thereby producing oscillations of frequency substantially equal to the sum of the selectable channel oscillator frequency and twice the carrier oscillator frequency;

elements defining a selectable sideband transmitting apparatus including all of said common elements, said elements including, a source of modulating signal to be transmitted, transmitter modulator means responsive to said common carrier oscillator and said source to produce sideband signal components thereof, means to apply said signal components to said common filter means, and transmitter means operable to mix signal from said filter means and, selectively, oscillations from said selectable channel oscillator or said common signal mixing means, thereby selectively providing transmitter signals in either the upper or the lower sideband of the selected channel;

elements defining a selectable sideband receiving apparatus including all of said common elements, said elements including, signal receiving means effective to receive signals in said channels, receiving mixing means responsive to said receiving means and, selectively, the output of said common selectable channel oscillator or said common signal mixing means, whereby a received signal in the upper or the lower sideband of said selected channel produces a sideband component at said predetermined frequency of the common carrier oscillator, means operable to apply signals from said receiving mixing means to said common filter means, means to mix the output of said common filter means and the common carrier oscillator, modulating signal reproducing means responsive to said last means; and, switch means selectively operable to render inactive the signal path defined by said transmitter elements in conjunction with said common means while maintaining the energization of said common means or to render inactive the signal path defined by said receiver elements in conjunction with said common means while maintaining the energization of said common means, whereby receiving or transmitting operations may be selectively established.

References Cited by the Examiner

UNITED STATES PATENTS

| | | | |
|---|---|---|---|
| 2,848,687 | 8/1958 | Stanphill | 332—45 |
| 2,852,749 | 9/1958 | Miedke | 332—45 |
| 2,947,860 | 8/1960 | Alvernaz | 325—467 |

OTHER REFERENCES

QST, "The Collins KWM-1 Transceiver," April 1958, pp. 23–27.

Publication: Instruction Book-Transceiver KWM-24, published by Collins Radio Co., 2nd ed. Apr. 15, 1960, pp. 2, 3, 8–12, 35 and 36.

DAVID G. REDINBAUGH, *Primary Examiner.*

JOHN W. CALDWELL, *Examiner.*